United States Patent
Sheynblat

(10) Patent No.: US 7,821,449 B2
(45) Date of Patent: Oct. 26, 2010

(54) BASE STATION ALMANAC ASSISTED POSITIONING

(75) Inventor: Leonid Sheynblat, Hillsborough, CA (US)

(73) Assignee: QUALCOMM Incorporated, San Diego, CA (US)

( * ) Notice: Subject to any disclaimer, the term of this patent is extended or adjusted under 35 U.S.C. 154(b) by 483 days.

(21) Appl. No.: 11/332,116

(22) Filed: Jan. 12, 2006

(65) Prior Publication Data

US 2006/0227045 A1    Oct. 12, 2006

Related U.S. Application Data

(60) Provisional application No. 60/643,562, filed on Jan. 12, 2005.

(51) Int. Cl.
G01S 1/02    (2006.01)
G01S 5/14    (2006.01)

(52) U.S. Cl. .............................. 342/357.09; 342/357.13

(58) Field of Classification Search ............ 342/357.01, 342/357.09, 357.13, 450, 457; 455/456.5, 455/456.6
See application file for complete search history.

(56) References Cited

U.S. PATENT DOCUMENTS

| 5,862,480 | A | 1/1999 | Wild et al. |
| 6,941,146 | B2 | 9/2005 | Knauerhase et al. |
| 7,286,838 | B2 | 10/2007 | Knauerhase et al. |
| 2003/0040331 | A1* | 2/2003 | Zhao ........................... 455/552 |
| 2006/0293052 | A1* | 12/2006 | Orler et al. ................... 455/434 |

FOREIGN PATENT DOCUMENTS

| EP | 0980190 | 2/2000 |
| GB | 2391767 | 2/2004 |
| WO | 9013211 | 11/1990 |
| WO | 2005051019 | 6/2005 |

OTHER PUBLICATIONS

International Search Report—PCT/US06/026190, International Search Authority—European Patent Office, Dec. 11, 2006.
Written Opinion—PCT/US06/026190, International Search Authority—European Patent Office, Dec. 11, 2006.
International Preliminary Report on Patentability—PCT/US06/026190, The International Bureau of WIPO, Geneva, Switzerland, Jul. 24, 2008.

* cited by examiner

*Primary Examiner*—Dao L Phan
(74) *Attorney, Agent, or Firm*—Andrea L. Mays; Arnold J. Gum

(57) ABSTRACT

A database provides base station almanac information pertaining to more than one network mode of communication. A wireless device accesses this database through a centralized server or network, or via the base station, base station controller or the like, with which it is currently communicating.

23 Claims, 1 Drawing Sheet

BASE STATION ALMANAC ASSISTED POSITIONING

RELATED APPLICATIONS

This application claims priority to U.S. Provisional Application No. 60/643,562, filed on Jan. 12, 2005.

TECHNICAL FIELD

The present method and apparatus relates generally to positioning systems for wireless user equipment, and more specifically to an almanac that contains the base station database for all or select set of base stations of a specific type.

BACKGROUND

Location determination systems allow wireless devices to find their geographic location or be located by remote entities by using satellites (e.g., GLONASS, GPS, Galileo, EGNOS, Globalstar, IRIDIUM) and/or base stations (e.g., cellular telephone base station, a wireless local area network, a wireless wide area network, satellite phone, satellite Internet, or any other device that can be uniquely recognized and communicate with the wireless device). These stations may be coupled to a base station almanac processor by way of a wide area network (WAN), but may also or alternatively use a local area network (LAN). The base station almanac processor accesses a base station database to tailor or customize an almanac according to the estimated location of the wireless device.

The wireless device can communicate with any number of devices to provide location information. The wireless device may be, for example, a cellular telephone that may have any number or combination of communication modes (e.g., GSM, CDMA, TDMA, WCDMA, OFDM, GPRS, EV-DO, WiFi, Bluetooth, WiMAX, 802.xx, UWB, satellite, etc.) to transfer voice and/or data with cellular, satellite, wireless data, and/or mesh networks by way of their base stations. The wireless device could also be a tracking device, a child or parolee monitor, navigational device, wireless pager, wireless computer, PDA, asset tag, etc.

SUMMARY

The method and apparatus disclosed herein provides an almanac that may contain the base station database for all or select set of base stations of a specific type (e.g., CDMA or WiFi or Bluetooth base stations).

BRIEF DESCRIPTION OF THE DRAWINGS

The present disclosure is described in conjunction with the appended FIGURE.

DESCRIPTION

Figure 1:
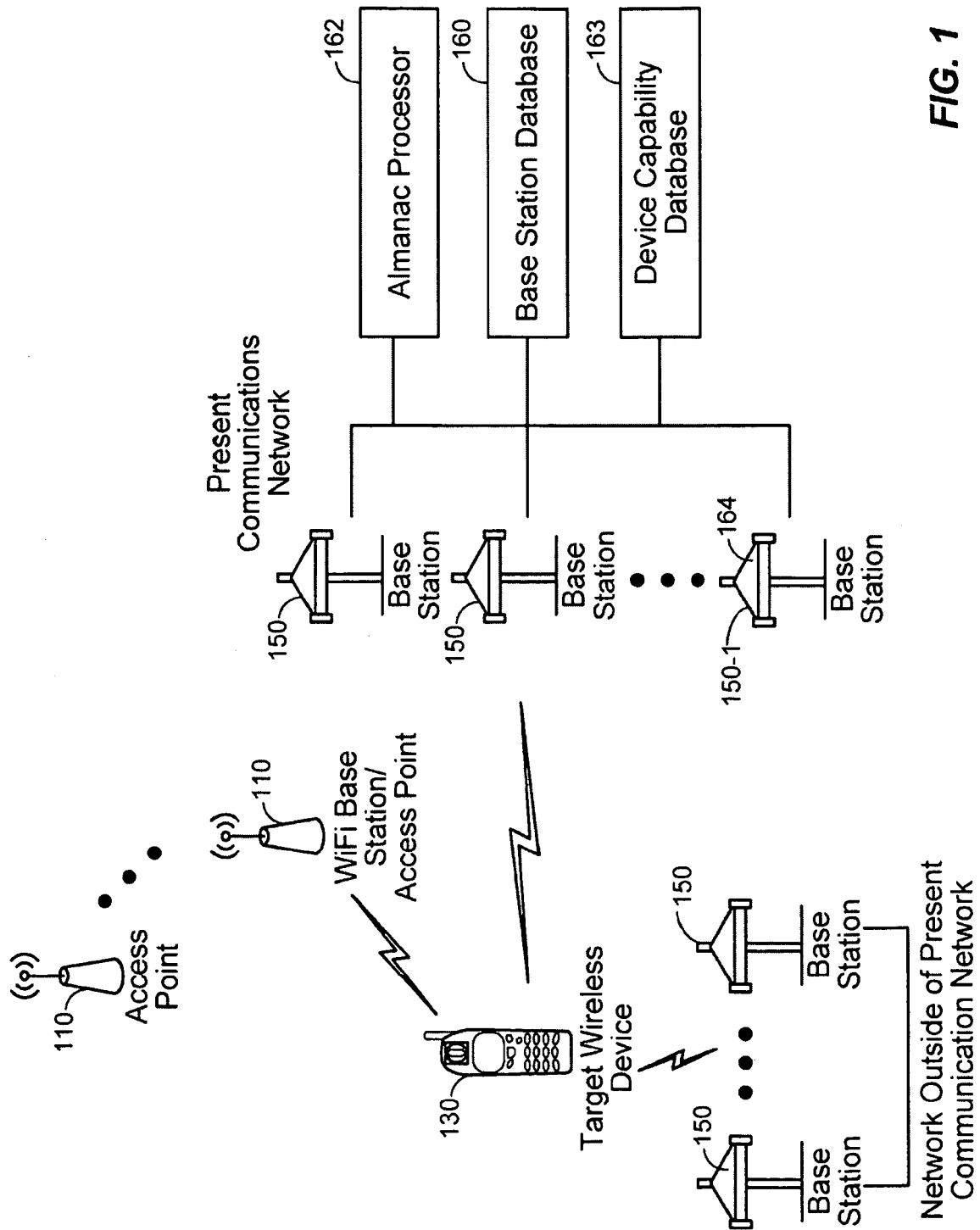
FIG. 1 is a diagram of an embodiment of a wireless communication system.

With the proliferation of multi-mode devices, the base station almanac for one particular mode of operation is not sufficient. If a target device can operate in more than one mode (e.g., CDMA and WiFi) for radio-location and communication purposes the device needs to know the almanac for both types of the base stations to operate properly. One feature of interest is the ability to seamlessly roam between the base stations of the same type or be banded over to a base station of a different type.

Referring to FIG. 1, either a centralized or a localized base station database 160 can be maintained for the base stations of the supported and relevant modes of communication (for example, may not be interested in the OMEGA base stations).

The supported communication modes for each wireless device 130 can be stored in a device capability database 163 that includes information to help in determining an uncertainty factor for each location or distance measurement made by a particular wireless device operating in any number of communication modes.

The almanac processor 162 may be separate from the base stations 150 (as shown), but each base station 150 or a group of base stations 150 could have a base station almanac processor 162 and/or databases in other embodiments. Alternatively, the almanac processor 162 can be integrated into the wireless device 130. The base station database 160 and/or device capability database 163 could also be in the wireless device 130 and updated periodically.

In some embodiments, the base station database 160 may be centrally located (as illustrated in FIG. 1), in others the base station database 160 may be distributed regionally or in portions relevant to each base station 150 or a group of base stations 150 as a local almanac. For example, a first base station 150-1, may store a portion of the base station database for its footprint and all adjacent base station footprints in a first local almanac 164. In another example, the first almanac may not be geographically organized but contain the base stations which are part of a particular service provider network. As the centrally-located base station database 160 is updated, those changes are propagated to the various local almanacs that might use the new information.

A target device 130 having access to the relevant base station almanac will be able to determine the location information given the knowledge of the communication mode and the identification of the base station 150 or a group of base stations 150 in the communication with the target device 130. The location determination can be performed either by the target device 130 or with the target-device assistance. In the target device-assisted mode, the device 130 provides the information sufficient for the location determination by the external entity.

To further improve the search of the base station almanacs for the appropriate information, the data can be organized utilizing the hierarchical coverage scheme. For a particular region, for example, the Bay Area, or area identified by SID/NID, the number of CDMA and GSM switches can be listed. Under each switch a number of GSM and CDMA base station controllers can be listed. For each base station controller a number of base stations are provided, for each base station a number of sectors (typically from 1 to 6). For each sector, the base station almanac can contain the number of know WiFi base stations (access points 110) located within the coverage of the particular sector. The same can be done for other local area base stations such as Bluetooth, UWB, ZigBee, RFID, etc. This classification can be extended to show cross references whereby some of the local area base stations can be within the signal coverage of the other local are base stations providing further granularity to the location information. For example, a number of Bluetooth base stations can be within coverage of a particular WiFi access point 110.

Each "computer", "base station", "base station controller", "server", or other network infrastructure, "wireless device", "mobile station", or "user equipment", referred to herein includes the necessary "computer-readable" media to perform the functions described herein, or is in communication with the necessary computer-readable media. The term "computer-readable medium" refers to any medium that participates in providing instructions to a processor for execution. The singular "medium" is defined herein to include the plural "media".

"Computer readable media" may take many forms, including but not limited to, "non-volatile media", "volatile media", and "transmission media". "Non-volatile media" includes, for example, optical or magnetic disks such as used for a storage medium. "Volatile media" includes dynamic memory. Common forms of "computer-readable media" include floppy disks, flexible disks, hard disks, magnetic tape, other magnetic mediums, CD-ROM or other optical medium, RAM, PROM, EPROM, FLASH EPROM, and other memory chips or cartridges, a carrier wave, or any medium from which a computer or processor, as those terms are known to those skilled in the art, can read. Databases, data, and/or records can be recorded or stored on computer readable media. The term "data" as used herein refers to information.

It will be understood as used herein that a processor or microprocessor can, but need not necessarily include, one or more microprocessors, embedded processors, controllers, application specific integrated circuits (ASICs), digital signal processors (DSPs), and the like. The terms processor and microprocessor are intended to describe hardware implementing the functions described rather than specific hardware. As used herein the term "memory" refers to any type of long term, short term, or other memory associated with the computer or other described device, and is not to be limited to any particular type of memory or number of memories, or type of media upon which memory is stored.

What is claimed is:

1. A method for determining a position of a multimode wireless device, the method comprising:
   receiving a request for base station almanac information pertaining to a network outside of the present communication network of a multimode wireless device from a multimode wireless device;
   accessing a database containing base station almanac information relevant to at least two network modes of operation of the multimode wireless device; and
   transmitting the requested information to the multimode wireless device.

2. The method of claim 1, further comprising determining supported modes for the multimode wireless communication device from a device capability database.

3. The method of claim 1, wherein the at least two network modes comprises a CDMA mode and a WiFi mode.

4. The method of claim 1, wherein accessing the database containing base station almanac information comprises accessing a local almanac having a base station footprint and adjacent base station footprints.

5. The method of claim 1, wherein accessing the database containing base station almanac information comprises accessing a centrally located base station database.

6. The method of claim 1, wherein accessing the database containing base station almanac information comprises accessing a database organized according to a hierarchical coverage scheme.

7. The method of claim 6, wherein the hierarchical coverage scheme is organized according to CDMA switches.

8. The method of claim 6, wherein the hierarchical coverage scheme is organized according to GSM switches.

9. The method of claim 1, wherein the database containing base station almanac information comprises a number of known WiFi access points within a particular base station sector.

10. The method of claim 1, wherein the database containing base station almanac information comprises information for at least one base station type selected from the group comprising Bluetooth, UWB, ZigBee, and RFID.

11. A system for determining a position of a multimode wireless device, the system comprising:
    a base station configured to receive, from the multimode wireless device, a request for base station almanac information pertaining to a network outside of a present communication network of the multimode wireless device;
    a base station database containing base station almanac information relevant to at least two network modes of operation of the multimode wireless device; and
    an almanac processor in communication with the base station and configured to access the base station database and retrieve the base station almanac information,
    wherein the base station is configured to transmit the base station almanac information to the multimode wireless device.

12. The system of claim 11, further comprising a device capability database configured to store supported communication modes of the multimode wireless device.

13. The system of claim 12, wherein the device capability database is further configured to store information to assist in determining an uncertainty factor for a location measurement for a communication mode.

14. The system of claim 11, wherein the base station database comprises:
    a regional database configured to store almanac information for a group of base stations; and
    a centrally located database configured to store base station almanac information from a plurality of regional databases.

15. The system of claim 14, wherein the regional database includes base station almanac information that is geographically organized.

16. The system of claim 14, wherein the regional database is organized according to a particular service provider.

17. The system of claim 11, wherein the base station database is organized according to a hierarchical coverage scheme.

18. A system for determining a position of a multimode wireless device, the system comprising:
    means for receiving a request for base station almanac information pertaining to a network outside of a present communication network of the multimode wireless device from the multimode wireless device;
    means for accessing a database containing base station almanac information relevant to at least two network modes of operation of the multimode wireless device; and
    means for transmitting the requested information to the multimode wireless device.

19. The method of claim 18, further comprising means for determining supported modes for the multimode wireless communication device from a device capability database.

20. The method of claim 18, wherein the at least two network modes comprises a CDMA mode and a WiFi mode.

21. The method of claim 18, wherein means for accessing the database containing base station almanac information comprises means for accessing a local almanac having a base station footprint and adjacent base station footprints.

22. The method of claim 18, wherein means for accessing the database containing base station almanac information comprises means for accessing a centrally located base station database.

23. The method of claim 18, wherein means for accessing the database containing base station almanac information comprises means for accessing a database organized according to a hierarchical coverage scheme.

* * * * *